UNITED STATES PATENT OFFICE.

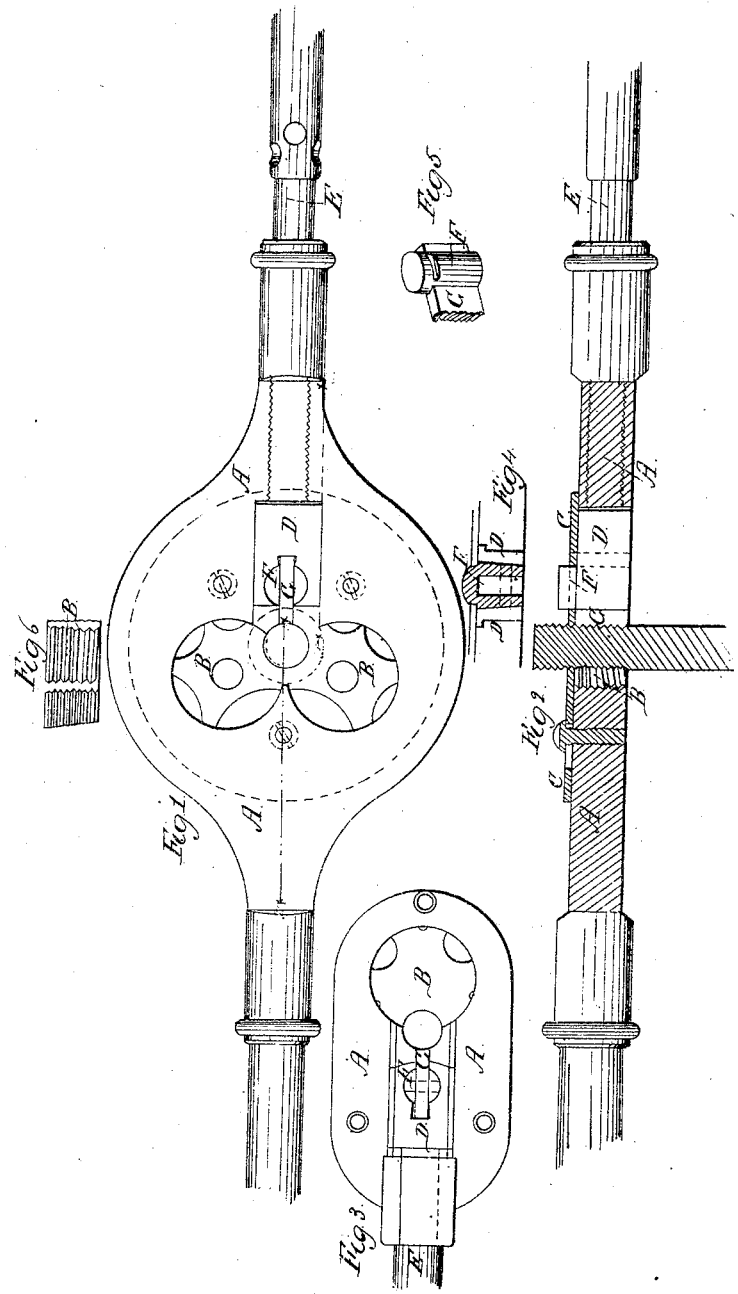

SIMEON GOODFELLOW, OF TROY, NEW YORK, ASSIGNOR TO HIMSELF AND JOHN FISH, OF SAME PLACE.

SCREW-STOCK.

Specification of Letters Patent No. 24,906, dated July 26, 1859.

*To all whom it may concern:*

Be it known that I, SIMEON GOODFELLOW, of Troy, in the county of Rensselaer and State of New York, have invented an Improvement in Screw-Stocks; and I do hereby declare that the following is a full, clear, and exact description of the same, reference being had to the accompanying drawings, and to the letters of reference marked thereon, of which—

Figure 1, represents a top view of the stock showing the top plate in red lines. Fig. 2, is a vertical section taken through the stock as indicated by the red lines *x*, *x*, of Fig. 1. Fig. 3, is a modification of the die or screw stock arranged for only one circular die. Fig. 4, is a section of the vibrating plug for carrying the chaser. Fig. 5, is a perspective view of the same showing the chasing tool placed therein. Fig. 6 is a side view of one of the circular dies.

My invention is an improvement upon the patent granted to me on the sixth day of December 1853, for an improved arrangement of screw cutting dies, in the die stock; in which I claimed the arrangement of circular dies, therein specified; and it consists in arranging in combination with a circular die or dies as set forth in the above patent, a vibrating die or chasing-tool which is held by a vibrating plug in the movable die holder in such a manner as to accommodate itself to the inclination of the thread when the die begins to cut on the surface as hereinafter described.

A, A, is the box or stock made of any suitable metal; B, the circular dies which are made slightly tapering in order to retain them in place in the box, when the top plate C, is screwed on. The circular guide dies and their arrangement in the stock are in all respects similar to those used under my present patent either one or more being employed as may be found necessary or convenient.

The small circular die or cutter employed in my old die stock is liable to many objections on account of its peculiar shape and position with relation to the circular die or dies. A sufficient clearance cannot be given to this kind of die and the consequence is, that it very soon wears and is rendered unfit for further use; but with my improved die it is so arranged as to act as a cutter so that not only is a perfect thread produced but the tenacity of the metal is preserved and less power employed in cutting the screw thread on the blank.

D, represents the movable die holder which is advanced as the operation of cutting proceeds by a screw handle E, which serves also the purpose of a lever for operating the stock. The movable die holder fits in a recess in the stock and may be kept in place by flanges projecting from either side and working in slots or guides in the stock, as shown by Fig. 4, or by any other suitable device.

F, is the vibrating plug which may be made tapering as shown by Fig. 4, or straight as shown by Figs. 1, 2, and 5. This plug fits in a circular recess in the end of the die holder D, and carries the chaser G, which passes longitudinally through a slot in the plug and fits into a recess in the die holder D, made slightly larger in width than the chaser so that the chaser will have a vibration or lateral movement in the operation of cutting as is necessary to allow that part of the cutting die which, when the stock is turned in the opposite direction would drag, to recede out of the thread so as to clear the thread and particles of metal cut out during the operation, by which arrangement the chaser or cutting die G, will preserve its keen edge. Suppose the operation of cutting to have been commenced at the bottom of a pin or blank and the stock arrived at the top; the handle or screw E, will require to be advanced a little and then the stock is ready to work in the opposite direction. It is evident that the moment the handles are pulled by the workman the die will bite on that side which is moved deeper by the pull, and recede out of cut on the opposite side; it will therefore act and cut like a tool in a lathe or planing machine, and preserve its keen edge much longer and remove filaments of metal much more easily than dies constructed in the ordinary way. When the edges of this cutting die G, gets dull it can be readily removed from the plug and sharpened in the same manner as sharpening a chasing tool. In this way one tool of this kind can be made to last for a long time while with the circular die described in my patent, it becomes useless in a short time and a new one is required to supply its place.

What I claim as my invention, and desire to secure by Letters Patent, is,

The cutting die G, in combination with the vibrating circular plug F, and the movable holder D, when the same are arranged and operated essentially as specified.

SIMEON GOODFELLOW.

Witnesses:
MOSES WARREN,
THOMAS NEANY.